(12) United States Patent
Kirchner et al.

(10) Patent No.: US 7,780,417 B2
(45) Date of Patent: Aug. 24, 2010

(54) WIND ENERGY PLANT WITH A ROTOR HUB

(75) Inventors: Jens Kirchner, Vorbeck (DE); Ulf Gopfert, Rostock (DE); Karsten Koop, Rostock (DE)

(73) Assignee: Nordex Energy GmbH, Norderstedt (DE)

( * ) Notice: Subject to any disclaimer, the term of this patent is extended or adjusted under 35 U.S.C. 154(b) by 723 days.

(21) Appl. No.: 11/759,544

(22) Filed: Jun. 7, 2007

(65) Prior Publication Data

US 2008/0193295 A1 Aug. 14, 2008

(30) Foreign Application Priority Data

Feb. 14, 2007 (DE) .................... 10 2007 008 167

(51) Int. Cl.
*F03D 11/00* (2006.01)
(52) U.S. Cl. .................... 416/207; 416/248; 416/155
(58) Field of Classification Search ............... 416/248, 416/205, 155, 239, 207, 220 A, 219 A
See application file for complete search history.

(56) References Cited

U.S. PATENT DOCUMENTS 4,915,590 A * 4/1990 Eckland et al. ............. 416/225

| | | | |
|---|---|---|---|
| 6,783,326 B2 * | 8/2004 | Weitkamp et al. | 416/1 |
| 7,331,761 B2 * | 2/2008 | Hansen et al. | 416/11 |
| 2008/0199315 A1 * | 8/2008 | Bech | 416/61 |

FOREIGN PATENT DOCUMENTS

| | | |
|---|---|---|
| DE | 20 2004 003 521 U1 | 7/2004 |
| DE | 103 51 524 A1 | 8/2004 |
| DE | 20 2005 007 450 U1 | 8/2005 |
| EP | 10 2004 017 323 A1 | 11/2005 |
| EP | 10 2004 023 773 B3 | 11/2005 |
| WO | 03/064854 A1 | 8/2003 |
| WO | 2004/090326 A1 | 10/2004 |

OTHER PUBLICATIONS

Wind Turbines Fundamental, Technologies Application, Economic, 2nd Edition, by Erich Hau, Springer-Verlag Berlin Heidelberg 2006, pp. 241-244.

* cited by examiner

*Primary Examiner*—Ninh H Nguyen
(74) *Attorney, Agent, or Firm*—Vidas, Arrett & Steinkraus P.A.

(57) ABSTRACT

A wind energy plant with a rotor hub which is connected to at least one pitch bearing, and with at least one rotor blade, the blade root of which is connectable to the pitch bearing via joining means, wherein a stiffening element is provided, which is arranged between the rotor blade root and the pitch bearing and connected to the same via the joining means.

10 Claims, 2 Drawing Sheets

WIND ENERGY PLANT WITH A ROTOR HUB

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind energy plant with a rotor hub, which is equipped with at least one pitch bearing.

The pitch bearing is a rolling bearing with an inner and an outer ring, one of the rings being connected to the rotor hub and the other ring being connected to the rotor blade. Thus, via a pitch drive, the rotor blade can be rotated around its longitudinal axis and its angle of attack can be adjusted towards the wind.

Known rotor hub constructions consist of a cast body with a flange for joining the pitch bearing. Erich Hau describes in "Windkraftanlagen, Grundlagen, Technik, Einsatz, Wirtschaftlichkeit, 3th edition, Springer Verlag Berlin" in chapter 7.5, the entire contents of which is incorporated herein by reference, that the quality and the weight of the rotor blades is essentially determined by the construction of the blade joining to the rotor hub, besides to the proper execution of the rotor blade. The constructive realisation of the blade joining on the rotor hub should belong to the most demanding goals of rotor blade development. Among the different realisations of the rotor blade joining there is the double-sided steel flange in which the blade root is clamped between an inner and an outer flange and the two flanges are screwed together with each other. The junction to the rotor hub takes then place via a lapped flange located at the outside. A further concept which has proven to be particularly weight-saving is laminated joining bolts, which are directly laminated into the rotor blade root structure. A further concept is to provide aviation-type laminated flanges or fastening sleeves in the rotor blade root, in order to join it with the rotor hub.

From DE 10 2004 023 773 B3, the entire contents of which is incorporated herein by reference, it is known to realise the pitch bearing with an inner ring, which is fixedly connected to the rotor hub, and with an outer ring which is fixedly connected to the rotor blade. The outer ring has an outer toothing which is in meshing engagement with a drive sprocket for adjusting the rotor blade.

From DE 10 2004 017 323 A1, the entire contents of which is incorporated herein by reference, a blade joining for a rotor blade is known, in which an arresting device is provided, which keeps the rotor blade free from backlash in a predetermined angle position.

From WO 2004/090326 A1, the entire contents of which is incorporated herein by reference, a rotor hub is known, which has a three-arm stiffening, formed in one piece in the region of the rotor blade joining.

The present invention is based on the objective to provide a blade joining for a rotor blade on a rotor hub, which avoids a too great load of the pitch bearing with simple means.

BRIEF SUMMARY OF THE INVENTION

The wind energy plant of the invention has a rotor hub which is equipped with at least one pitch bearing. Further, at least one rotor blade is provided, which has a flange at the blade root for connection to the pitch bearing. According to the invention, a stiffening element is provided, which is arranged between the flange at the blade root and the pitch bearing. The stiffening element enhances the radial stiffness in the region of the blade root in particular, which is normally significantly lower than the radial stiffness of the hub in the region of the pitch bearing, due to the selection of the material for the rotor blade. In this, the stiffening element is held between the pitch beating and the rotor blade root by those joining means which are also used in the direct fastening of the rotor blade on the pitch bearing. The invention is based on the finding that an unequal stiffness has disadvantageous effects for the pitch bearing and leads to an unfavourable force transmission in the same. Through this, the rolling bearing of the pitch bearing is strongly stressed without need and its lifespan is diminished. The stiffening element provided according to the present invention improves the force transmission in the bearing of the pitch bearing, and with it the lifespan as well as the tolerance for extreme loads of the pitch bearing.

In one preferred embodiment, the stiffening element is realised as a ring or as a plate It may also be realised as a vat. The plate or the vat can have a closed bottom or they may be provided with one or several openings.

In a preferred extension, the stiffening element according to the present invention is made from metal. In doing so, steel or a cast material can be used. As the cast material, cast iron with nodular graphite is preferably used, for instance corresponding to DIN EN 1563 (EN-GJS-400-18, for instance).

In a particularly preferred embodiment, the stiffening element connected to the blade root has a stiffness which corresponds to the stiffness in the region of the junction of the pitch bearing and the rotor hub The stiffness in the region of the junction between the rotor hub and the pitch bearing results from the material provided at the hub side as well as from the geometry in the joining region at the hub side.

The stiffening element can also serve as a carrier element and it may carry components of a pitch system.

In a preferred embodiment, a carrier element is provided at the hub side of the pitch bearing, which is connected to the rotor hub and to the pitch bearing. In this, the carrier element has two tasks: on the one hand, it can be realised in its material and in its geometry such that the stiffness in the region of the hub side junction in the pitch bearing corresponds to the stiffness of the junction at the rotor blade side. On the other hand, the carrier element can still be used to serve as a carrier for the pitch drive and/or a pitch control unit.

BRIEF DESCRIPTION OF THE SEVERAL VIEWS OF THE DRAWINGS

In the following, the present invention is explained in more detail by means of an example.

DETAILED DESCRIPTION OF THE INVENTION

Figure 1:
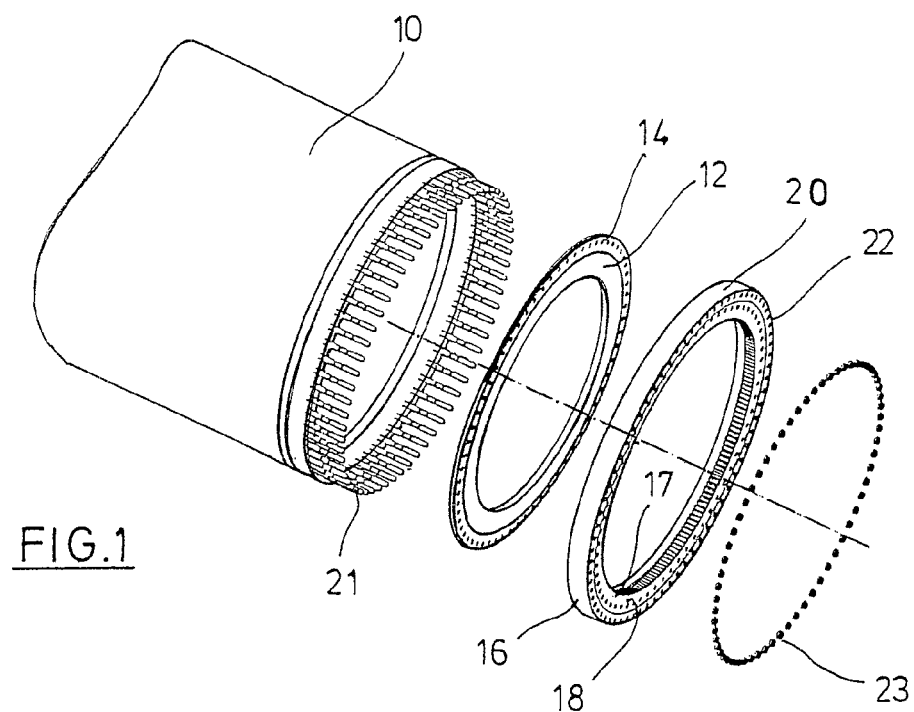
FIG. 1 shows the rotor blade root with a stiffening element and the pitch bearing, in an elongated perspective view.

While this invention may be embodied in many different forms, there are described in detail herein a specific preferred embodiment of the invention. This description is an exemplification of the principles of the invention and is not intended to limit the invention to the particular embodiment illustrated FIG. 1 shows a rotor blade 10 in the region of the blade root. At the hub side of the rotor blade root, a stiffening element 12 is represented. The stiffening element 12 is realised annular and has bores 14 arranged to run along a circle, through which the fastening bolts for the rotor blade 10 are guided. The bores extend in the axial direction of the stiffening element. The stiffening element 12 has a uniform thickness. Alternatively, a thickness variable in the radial direction may also be provided. The inner diameter of the stiffening element is smaller than the inner diameter of the blade root.

The rotor blade 10 is connected to the rotor hub via an annular pitch bearing 16. The pitch bearing 16 consists of a rolling bearing with an inner ring 18 and an outer ring 20. Both rings are provided with bores. In the shown example of realisation, the bores 14 in the stiffening element 12 correspond in diameter, arrangement and distance to the bores of the inner ring 18 of the pitch bearing 16. The outer diameter of the stiffening element 12 corresponds to the outer diameter of the inner ring 18. The inner ring 18 is screwed together with the stiffening element 12 and the rotor blade. The outer ring 20 is designed for connection with corresponding fastening bores on the rotor hub with its bores 22.

Figure 2:
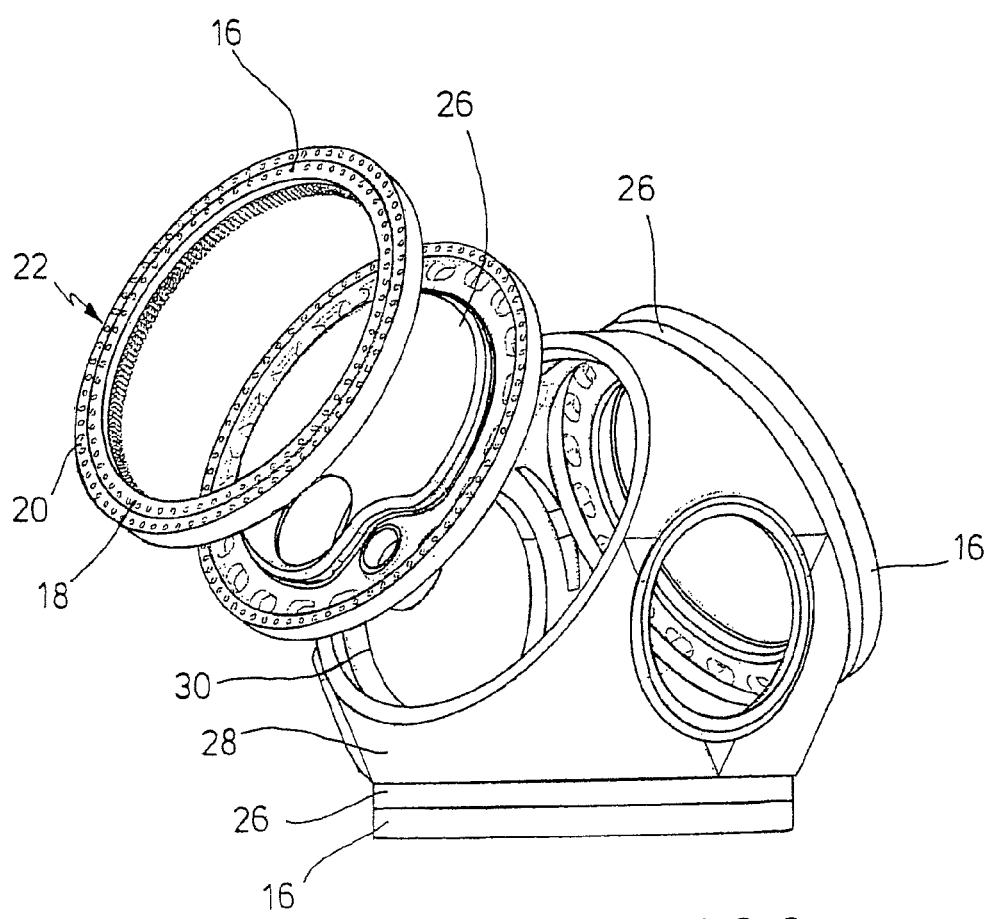
FIG. 2 shows the pitch bearing, a carrier element and the rotor hub in an elongated perspective view.

The rotor hub is realised in four parts in the construction example shown in FIG. 2. The rotor hub has a carrier element 26 and a rotor hub body 28. The outer ring 20 is screwed together with the carrier element 26 and the rotor hub body. As can be recognised e.g. from the perspective representation in FIG. 2, the rotor hub is provided for connecting three rotor blades to it. Further, the rotor hub is connected to the rotor shaft of the wind energy plant in the region 30, in order to transfer the torque taken up by the rotor blades to the rotor shaft.

Figure 3:
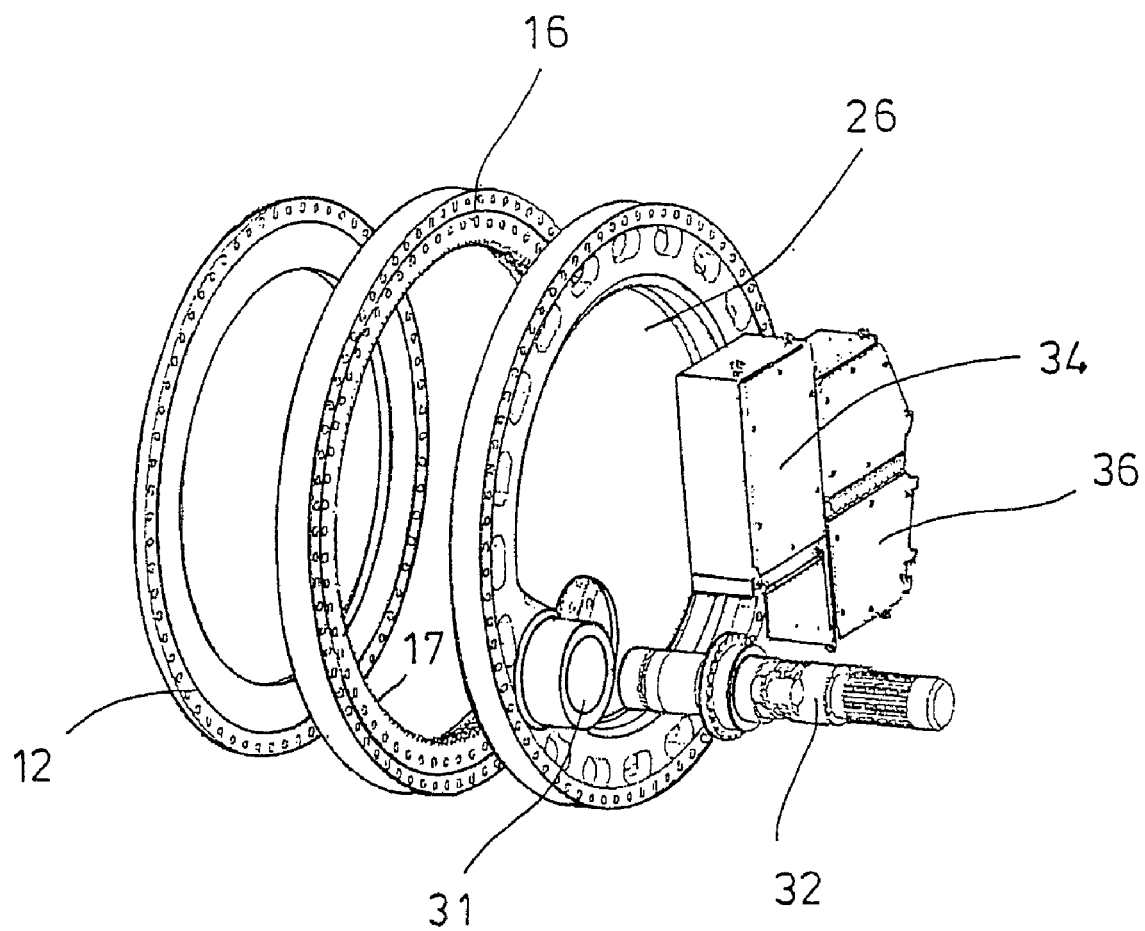
FIG. 3 shows the stiffening element, the pitch bearing and the carrier element with pitch drive and control unit on the carrier element.

FIG. 3 shows the carrier 26 seen from the hub side. The carrier 26 has a passage opening 31, through which a pitch drive 32 projects from the rotor hub. The pitch drive 32 has a drive pinion, which meshes in a toothing 17 of the pitch bearing 16 provided on the inner side. By the pitch drive, the relative position between inner ring and outer ring is adjusted and the rotor blade is rotated around its longitudinal axis. Further, a converter cabinet 34 and an accumulator cabinet 36 for the pitch system are provided on the carrier element 26. All in all, the complete pitch system can be pre-mounted on the carrier element 26. Thus, the installation is also significantly simplified, because the carrier element can be tested independently from the installation of the rotor hub housing.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a rotor hub which is connected to at least one pitch bearing (16), and with at least one rotor blade (10), the blade root of which is connectable to the pitch bearing via joining means, characterised in that a stiffening element (12) is provided, which is arranged between the rotor blade root and the pitch bearing (16) and connected to the same via the joining means.

2. A wind energy plant according to claim 1, characterised in that the stiffening element (12) has the shape of a ring.

3. A wind energy plant according to claim 1, characterised in that the stiffening element (12) is realised as a plate.

4. A wind energy plant according to claim 1, characterised in that the stiffening element (12) is realised as a vat.

5. A wind energy plant according to claim 3, characterised in that the stiffening element (12) is provided with one or several openings.

6. A wind energy plant according to claim 1, characterised in that the stiffening element (12) is made from metal.

7. A wind energy plant according to claim 1, characterised in that the junction from rotor blade and stiffening element (12) has a stiffness which corresponds to the stiffness in the region of the junction of the pitch bearing and the rotor hub.

8. A wind energy plant according to claim 1, characterised in that the stiffening element (12) is provided as a carrier element for components of a pitch system.

9. A wind energy plant according to claim 1, characterised in that a carrier element is provided at the hub side of the pitch bearing which is connected to the rotor hub and to the pitch bearing.

10. A wind energy plant according to claim 9, characterised in that the components of the pitch system for the rotor blade are provided on the carrier element at the rotor hub side.

* * * * *